(12) United States Patent
Fishman et al.

(10) Patent No.: US 7,020,567 B2
(45) Date of Patent: Mar. 28, 2006

(54) SYSTEM AND METHOD OF MEASURING A SIGNAL PROPAGATION DELAY

(75) Inventors: Alex Fishman, Sunnyvale, CA (US); Serguei Dorofeev, Sunnyvale, CA (US); Dmitri Bannikov, Mountain View, CA (US); Robert Lee Fennelly, San Jose, CA (US); Andreas Weber, Los Altos, CA (US); Subra Nagarajan, Livermore, CA (US)

(73) Assignee: Finisar Corporation, Sunnyvale, CA (US)

( * ) Notice: Subject to any disclaimer, the term of this patent is extended or adjusted under 35 U.S.C. 154(b) by 177 days.

(21) Appl. No.: 10/695,477

(22) Filed: Oct. 28, 2003

(65) Prior Publication Data

US 2004/0122607 A1 Jun. 24, 2004

Related U.S. Application Data

(60) Provisional application No. 60/423,968, filed on Nov. 5, 2002, provisional application No. 60/422,598, filed on Oct. 31, 2002, provisional application No. 60/423,959, filed on Nov. 5, 2002.

(51) Int. Cl.
G01R 29/26 (2006.01)

(52) U.S. Cl. .......................... 702/69; 702/68; 702/176; 375/259; 375/346; 375/354; 375/355; 375/350; 714/781

(58) Field of Classification Search ................ 702/681, 702/691, 176; 375/259, 346, 354, 355, 350; 370/341, 364, 442, 485, 441; 714/781
See application file for complete search history.

(56) References Cited

U.S. PATENT DOCUMENTS

| 4,346,470 | A | * | 8/1982 | Alvarez et al. ............. 370/324 |
| 4,387,458 | A | * | 6/1983 | Carbrey ...................... 370/431 |
| 5,268,949 | A | | 12/1993 | Watanabe et al. |
| 5,748,672 | A | | 5/1998 | Smith et al. |
| 5,761,216 | A | | 6/1998 | Sotome et al. |
| 5,991,308 | A | * | 11/1999 | Fuhrmann et al. ...... 370/395.53 |
| 6,307,868 | B1 | * | 10/2001 | Rakib et al. ................. 370/485 |
| 6,356,555 | B1 | * | 3/2002 | Rakib et al. ................. 370/441 |
| 6,493,653 | B1 | * | 12/2002 | Drinkard et al. ............ 702/176 |
| 6,661,836 | B1 | | 12/2003 | Dalal et al. |
| 6,665,308 | B1 | * | 12/2003 | Rakib et al. ................. 370/441 |
| 6,694,462 | B1 | | 2/2004 | Reiss et al. |
| 6,850,663 | B1 | * | 2/2005 | Kikuchi et al. ............... 385/24 |
| 6,851,086 | B1 | * | 2/2005 | Szymanski .................. 714/781 |
| 2001/0001616 | A1 | * | 5/2001 | Rakib et al. ................. 375/259 |
| 2001/0024474 | A1 | * | 9/2001 | Rakib et al. ................. 375/259 |
| 2001/0046266 | A1 | * | 11/2001 | Rakib et al. ................. 375/259 |
| 2002/0015423 | A1 | * | 2/2002 | Rakib et al. ................. 370/485 |
| 2003/0156603 | A1 | * | 8/2003 | Rakib et al. ................. 370/485 |

* cited by examiner

*Primary Examiner*—Carol S. W. Tsai
(74) *Attorney, Agent, or Firm*—Workman Nydegger (57) ABSTRACT

The present invention relates generally to an improvement in the ability of test systems to test bit processing capacities of electronic devices, and in particular an improvement in their ability to measure a signal propagation delay through an object connected to an optoelectronic device. The present invention includes determining for how long after a specific bit or bit group is transmitted by an optical transceiver the bit or bit group is received at the other end of the object connected to the optical transceiver.

20 Claims, 6 Drawing Sheets

SYSTEM AND METHOD OF MEASURING A SIGNAL PROPAGATION DELAY

CROSS-REFERENCE TO RELATED APPLICATIONS

The present application claims priority to and the benefit of U.S. Provisional Patent Application No. 60/423,968, filed on Nov. 5, 2002 and entitled "A System and Method of Measuring a Signal Propagation Delay," U.S. Provisional Patent Application No. 60/422,598, filed on Oct. 31, 2002 and entitled "A System and Method of Measuring Turn-On and Turn-Off Times of an Optoelectronic Device," and U.S. Provisional Patent Application No. 60/423,959 filed on Nov. 5, 2002 and entitled "A System and Method of Testing a Transceiver," all of which are hereby incorporated by reference in their entireties. The present application is also related to U.S. patent application Ser. No. 10/285,082, filed on Oct. 31, 2002 and entitled "A System and Method of Processing a Data Signal," and U.S. patent application Ser. No. 10/285,081, filed on Oct. 31, 2002 and entitled "A System and Method of Detecting a Bit Processing Error," both of which are also hereby incorporated by reference in their entireties.

BACKGROUND OF THE INVENTION

1. The Field of the Invention

The present invention relates generally to an improvement in the ability of test systems to test bit processing capacities of devices, and in particular an improvement in their ability to measure a signal propagation delay through objects (e.g., devices and/or cables used to connect these devices).

2. The Relevant Technology

A bit error rate ("BER") is a ratio of bits received, processed, and/or transmitted with errors to a total number of bits received, processed, and/or transmitted over a given period of time. If, for example, a transmission has 1 million bits and one of these bits is in error (e.g., a bit is in a first logic state instead of a second logic state), the transmission has a BER of $10^{-6}$. The BER is useful because it can be used to characterize the ability of a device to receive, process, and/or transmit bits.

Many devices are designed to receive, process, and then transmit a plurality of bits. An optoelectronic transceiver, for example, typically receives a plurality of bits in an electrical form and then transforms and transmits the bits in an optical form and/or receives a plurality of bits in an optical form and then transforms and transmits the bits in an electrical form. Such devices require a finite amount of time to make these transformations. This finite amount of time is known as the signal propagation delay. It is often useful to measure the signal propagation delay for a particular signal traveling from one point to another. The points can be relatively close, such as two devices on the same local area network, or widely scattered, such as two devices in different cities. Measuring the signal propagation delay enables individuals to identify whether or not data propagates efficiently between the two points.

In the past, measuring a propagation delay through a device and/or cables used to connect these devices was a costly operation. For example, an AGILENT ®-brand Digital Communication Analyzer (Serial BERT 3.6 Gb/s Bit Error Ration Testor) which currently retails for more than ninety thousand dollars was required to take such measurements with precision comparable to that of the present invention.

In order to use the prior art device, one needed a signal generator, a signal splitter, the device under test (DUT), and an oscilloscope with two channels. One would then need to connect the output of the signal generator through the signal splitter to the DUT input and the first channel of the oscilloscope. The second channel of the oscilloscope could then be connected to the DUT output. Then, using either the oscilloscope screen or the screen file one could figure out the propagation delay, which would then correspond to a time distance between two wave forms. Using this method, scopes with a precise time base give better resolution. Unfortunately, one needs a very large memory capacity to measure long delays in a precise time base with high resolution.

BRIEF SUMMARY OF THE INVENTION

What is needed in the art is a method of measuring a signal propagation delay without all of the external equipment mentioned above. The present invention uses a built in signal generator without a splitter or oscilloscope to measure a signal propagation delay.

The present invention includes a method for measuring a propagation delay by introducing a bit error into a bit sequence and measuring the time that it takes for the error to reappear at the generating station. The method includes the steps of 1) generating a bit sequence by reference to a controlling pattern; 2) transmitting the bit sequence through an object (such as an optical fiber and/or an electronic or optoelectronic device); 3) receiving the bit sequence from the object and a second bit sequence generated by reference to the controlling pattern; 4) injecting a bit error into a bit group of the bit sequence after initiating the generating step; 5) checking bit groups from the bit sequence from the object for the bit error; 6) maintaining a count that is incremented each time the comparing step is executed after the injecting step is executed; 7) terminating the comparing step when the bit error is detected in a bit group from the bit sequence from the object; and 8) computing the propagation delay by reference to a count corresponding to the bit group from the bit sequence from the object with the bit error.

The disclosed method is much cheaper to implement than the purchase of a standard digital communications analyzer. The equipment needed to implement the invention is available off the shelf, and collectively costs tens of thousands of dollars less than a commercial communications analyzer. Yet the disclosed method is very accurate.

These and other objects and features of the present invention will become more fully apparent from the following description and appended claims, or can be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EXEMPLARY EMBODIMENTS

Reference will now be made to the drawings to describe exemplary embodiments of the invention. It is to be understood that the drawings are diagrammatic and schematic representations of the exemplary embodiments, and are not limiting of the present invention, nor are they necessarily drawn to scale.

Figure 1:
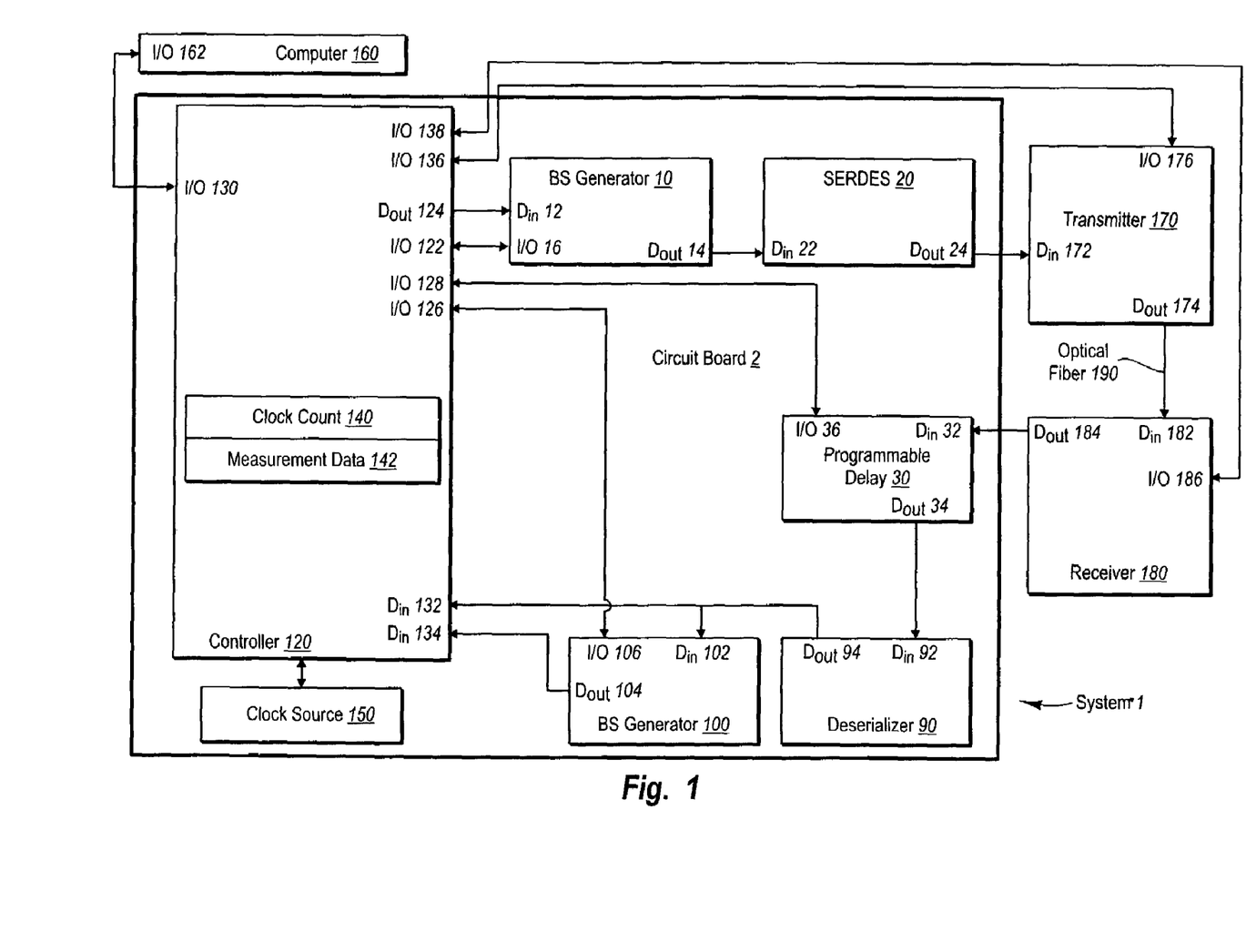
FIG. 1 is a block diagram of an exemplary system in accordance with the present invention.

Referring to FIG. 1, there is shown a system 1 consistent with an embodiment of the present invention. As illustrated in FIG. 1, system 1 includes a circuit board 2 that is an isolated board that provides power and ground connections for various electrical components mounted or housed thereon. Illustratively, mounted to circuit board 2 are a first bit sequence ("BS") generator 10, a serializer/deserializer ("SERDES") 20, a programmable delay 30, a deserializer 90, a second BS generator 100, a controller 120, and a clock source 150. Electrically communicating with system 1 are a computer 160, a transmitter 170 and a receiver 180. Transmitter 170 and receiver 180 are connected by an optical fiber 190.

The BS generators 10, 100 are linear feedback shift registers. For example, a given BS generator can be a binary shift register with taps that are modulo-2 added together and fed back to the binary shift register as input. Persons skilled in the art recognize that the configuration and function of the taps, or similar circuitry, typically define bit sequences produced by a BS generator. In particular, these configurations and functionalities define a second bit group that is produced when a first bit group is input into a BS generator.

The bit groups generated by a BS generator are typically output simultaneously in parallel form, but can be output serially as well. Additionally, bit sequences generated by a BS generator are preferably pseudo random bit sequences. Alternately, the bit sequences can be other deterministic sequences, such as, Gold, JPL, and Barker Codes. As a result, a plurality of BS generators can be configured in the same way so that each produces the same bit group from like input. The BS generators illustrated in FIG. 1 include an I/O port, a $D_{in}$ port, a $D_{out}$ port (i.e., the I/O port 16, $D_{in}$ port 12, and $D_{out}$ port 14 and the I/O port 106, $D_{in}$ port 102, and $D_{out}$ port 104 of the first and second BS generators, respectively), and a port for receiving a clock signal originating from the clock source 150 (connections not illustrated).

The $D_{in}$ port can be a parallel port (with a number "n" signals, channels, lines, etc.), but can also be a serial port (1 signal, channel, line, etc.), that is used to receive data such as bit groups (e.g., a seed value that identifies a starting bit group in a sequence of bits). The $D_{out}$ port is typically a parallel port, but can be a serial port, that is used to transmit bit groups.

The I/O port can be a parallel or serial port that is used to receive control signals from controller 120. These control signals can, for example, configure a BS generator (e.g., configure the taps or similar circuitry that typically defines the type of bit sequences produced and the cycle length, uniformity, and independence of these bit sequences) and initiate and/or terminate the generation of a bit sequence by a BS generator.

The Serializer/Deserializer (SERDES) 20 can be a device for receiving data in parallel and transmitting this data serially. One example of such a device would be an ON SEMICONDUCTOR®-brand 8-Bit parallel to serial converter MC100EP446. As illustrated in FIG. 1, SERDES 20 includes a $D_{in}$ port 22 and a $D_{out}$ port 24. The $D_{in}$ port 22 can receive bit groups in parallel and $D_{out}$ port 24 can serially transmit bit groups received through $D_{in}$ port 22.

The SERDES 20 can also include one or more ports (not illustrated) for exchanging control signals with controller 120 and for receiving a clock signal originating from clock source 150. These ports enable controller 120 to, for example, control how SERDES 20 receives, transforms, and transmits data. These ports can, furthermore, include a plurality of separate signals for address bits, an alarm interrupt, a chip select, a write input, a read input, a bus type select, a test input, an address latch enable, and other control parameters.

The programmable delay 30 includes a $D_{in}$ port 32, a $D_{out}$ port 34, and an I/O port 36. The programmable delay 30 can be a programmable delay circuit, such as an ON SEMICONDUCTOR®-brand ECL Programmable Delay Chip MC100EPI96. A data signal applied to an input 32 of programmable delay 30 reappears at an output 34 of programmable delay 30, after a delay of a specified amount of time. Both leading and trailing edges of data signal pulses are delayed by the same amount of time, which is typically programmable by controller 120 using either a serial or parallel data input.

The data signal generated by receiver 180 is transmitted to programmable delay 30 through $D_{in}$ port 32. The data signal, after the specified delay, is then transmitted to deserializer 90 through $D_{out}$ port 34. The controller 120 sets the delay of programmable delay 30 through I/O port 36, which functions as a control port accessible to controller 120.

The deserializer 90 can be a device, such as a MICREL 3.3V ANYRATE®-brand MUX/DEMUX SY87724L, for receiving data serially and transmitting this data in parallel. As illustrated in FIG. 1, deserializer 90 includes a $D_{in}$ port 92 and a $D_{out}$ port 94. The $D_{in}$ port 92 receives bit groups serially and $D_{out}$ port 94 transmits these bit groups in parallel. The deserializer 90 can also include one or more ports (not illustrated) for exchanging control signals with controller 120. These ports enable controller 120 to, for example, control how deserializer 90 receives, transforms, and transmits data.

The controller 120 includes a computer processor on a microchip such as a MOTOROLA®-brand bit processor or other chip combining an 8-bit architecture with an array of field-programmable logic. The controller 120 directs the operation of circuitry on circuit board 2 (not all connections illustrated) and stores and manipulates data provided by this circuitry. Controller 120 completes these tasks, under the direction of computer 160. In some embodiments of the present invention, controller 120 may not have the capacity to perform measurements, which are described below, without computer 160.

The controller 120 includes a first I/O port 122, a $D_{out}$ port 124, a second I/O port 126, a third I/O port 128, a fourth I/O port 130, a fifth I/O port 136, a sixth I/O port 138, a first $D_{in}$ port 132, a second $D_{in}$ port 134, and a port for receiving a clock signal originating from clock source 150 (connections not illustrated). The controller 120 can send and receive control signals, configuration data, etc. to some or all of the circuitry and/or devices illustrated in FIG. 1 without departing from the scope of the present invention.

In particular, controller 120 can configure BS generators 10, 100 and trigger or terminate the generation of bit sequences by BS generators 10, 100. The controller 120 sends data to $D_{in}$ port 12 of first BS generator 10 through $D_{out}$ port 124. This data is typically a seed value for the generation of a bit sequence, but can be other data as well. Additionally, controller 120 transmits and receives control signals, configuration data, etc. to/from I/O port 106 of second BS generator 100 through second I/O port 126.

The controller 120 communicates with computer 160 through fourth I/O port 130. In exemplary embodiments, computer 160 exchanges control signals and/or data with controller 120, which interacts with some or all of the other circuitry on circuit board 2, to setup, initiate, and monitor measurements.

The controller 120 can also include logic for comparing a first group of bits to a second group of bits (i.e. a comparator). More specifically, controller 120 compares bits of like position within their respective group of bits. For instance, the second bit in a first group of bits is compared to the second bit in a second group of bits. In addition to making such comparisons, controller 120 stores comparison results, which can include a specification of individual bits within a group of bits that do not match. The controller 120 includes $D_{in}$ ports 132, 134 to receive bits for these comparisons from circuitry on circuit board 2. For instance, ports 132, 134 receive signals from deserializer 90 and second BS generator 100, respectively.

Finally, controller 120 also includes logic to maintain, increment, and clear a clock count 140. This clock count 140 indicates the number of clock cycles that occur during, for example, a measurement of the propagation delay. The controller 120 also includes logic for storing measurement data 142, which typically includes a value of clock count 140. The substance and use of clock count 140 and measurement data 142 is described in more detail below with reference to FIG. 3.

The clock source 150 is designed to provide a clock signal at a desired frequency. The clock source 150 can be a single, self contained circuit such as an AMPTRON®-brand or CARDINAL COMPONENTS, INC. ®-brand crystal based oscillator. Such circuits are single frequency circuits, but clock source 150 can also have multiple-frequency capability. The clock source 150 can also have a plurality of circuits including a primary circuit and external timing components. In an exemplary embodiment, clock source 150 is capable of generating a clock signal at a frequency on the order of one picosecond or less.

The clock source 150 includes a plurality of ports to communicate a clock signal to some or all of the circuitry and devices illustrated in FIG. 1. Ports and connections for these communications are not illustrated. The clock source 150 includes an I/O port to receive configuration data from the controller 120, such as frequency definitions (ports and connection not illustrated). Also not illustrated in FIG. 1 are one or more demultiplexers and/or one or more dividers or multipliers that enable clock source 150 to drive two or more components at one or more frequencies. For example, SERDES 20, programmable delay 30, and deserializer 90 can operate at a higher frequency than controller 120 and BS generators 10, 100.

The transmitter 170 and receiver 180 are any electronic device capable of receiving, transforming, and transmitting a data signal. Typically, these devices are optoelectronic packages and can form part of a transmitter optical sub-assembly or receiver optical sub-assembly. As such, these devices are capable of receiving a data signal in an electrical form and transmitting the data signal in an optical form and vice versa. Each of these devices can include a $D_{in}$ and $D_{out}$ port (e.g., $D_{in}$ port 172 and $D_{out}$ port 174 of transmitter 170 and $D_{in}$ port 182 and $D_{out}$ port 184 of receiver 180). Each of these devices also can include an I/O port (e.g., I/O port 176 of transmitter 170 and I/O port 186 of receiver 180)

The $D_{in}$ port 172 of transmitter 170 receives data electrically from $D_{out}$ port 24 of SERDES 20. The $D_{out}$ port 174 of transmitter 170 transmits data optically to $D_{in}$ port 182 of receiver 180. The $D_{out}$ port 184 of receiver 180 transmits data electrically to $D_{in}$ port 102 of programmable delay 30.

The I/O ports are used to exchange control signals with controller 120. In particular, transmitter 170 and receiver 180 can receive, for example, a transmitter disable signal from controller 120. The state of this signal (e.g., a digital one or zero), enables the optical transmitter circuitry of transmitter 170. Finally, for purposes of the invention, receiver 180 is a device that has been confirmed to operate properly. Its use may be practical in nature because system 1 does not include circuitry capable of receiving data optically.

The transmitter 170 is so named because it transmits signals to optical fiber 190, which can be the subject of the propagation delay measurement. Similarly, receiver 180 is so named because it receives signals from optical fiber 190. The optical fiber 190 includes a glass or plastic flexible optically transparent fiber of variable length through which a data signal in the form of light is transmitted by successive internal reflections. Commonly available single mode or multi-mode fiber optic cable is generally considered sufficient to act as optical fiber 190.

Figure 2:
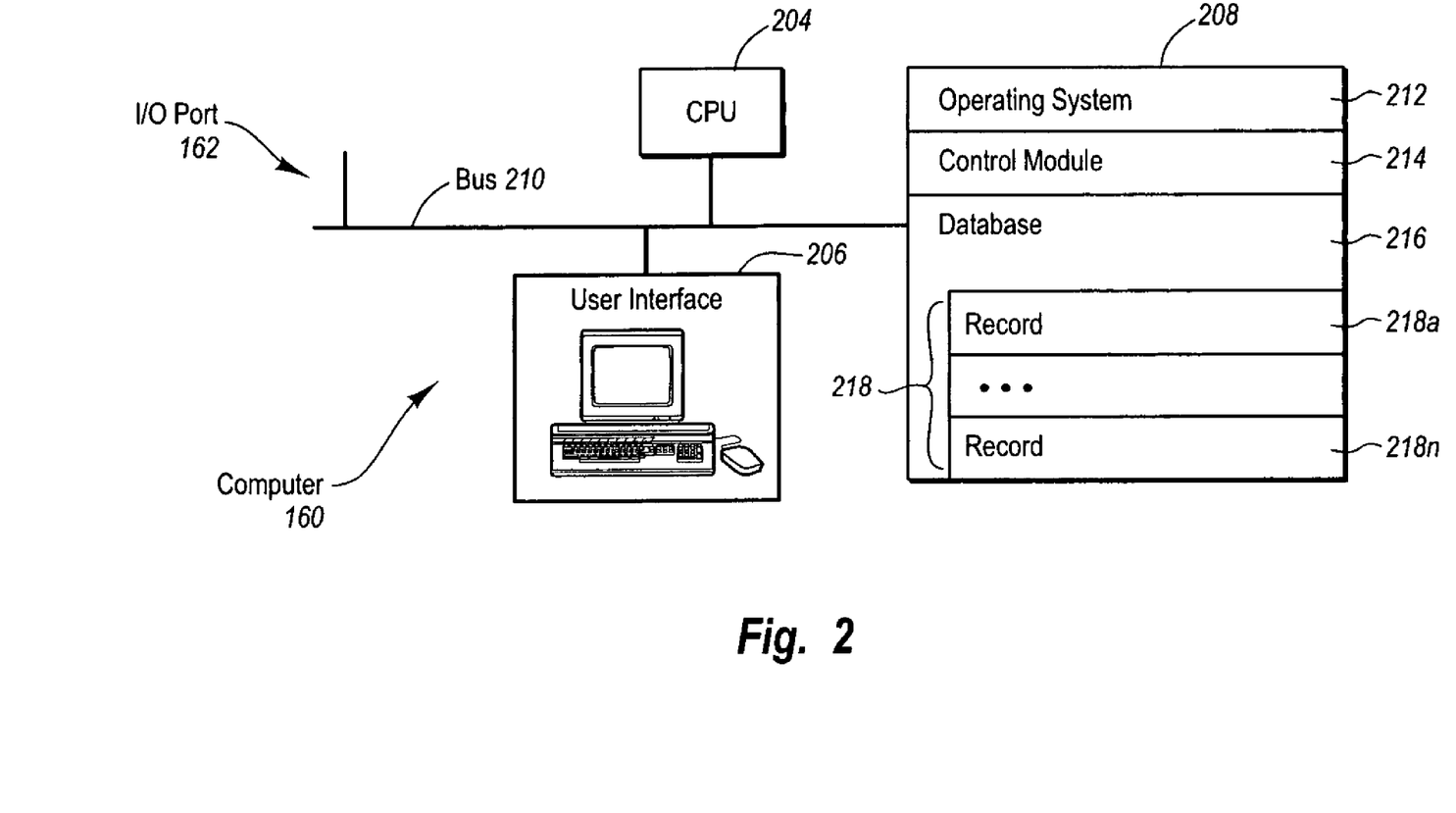
FIG. 2 is a block diagram of the exemplary computer system shown in FIG. 1.

Referring to FIG. 2, there is shown a more detailed illustration of computer 160. In addition to I/O port 162 illustrated in FIG. 1, computer 160 includes standard computer components such as one or more processing units 204, one or more user interfaces 206 (e.g., keyboard, mouse, and a display), memory 208, and one or more busses 210 to interconnect these components. The memory 208, which can include high speed random access memory as well as non-volatile storage such as disk storage, can store an operating system 212, a control module 214, and a database (or one or more files) 216, which can include a plurality of records 218.

An operating system 212 can include procedures for handling various basic system services and for performing hardware dependent tasks. The one or more processing units 204 can execute, for example, tasks for control module 214 under the direction of operating system 212. The operating system 212 can also provide control module 214 with access to other system resources such as, but not limited to, memory 208 and user interface 206.

The control module 214 is designed to manipulate system 1 in accordance with the present invention. In particular, control module 214 interacts with controller 120 through I/O port 162 to initiate and monitor measurements. As described in more detail below, control module 214 directs controller 120 to initialize one or more other components included in system 1 and, if need be, to obtain information about the one or more other components that are not connected directly to computer 160. The control module 214 can engage in such communication with controller 120 before, during, and after measurements. The control module 214 can communicate results of measurements through user interface 206 as needed.

Although separate ports are illustrated in FIGS. 1 and 2 and discussed above with respect to various circuitries, some embodiments of the present invention can include additional or fewer ports without departing from the scope of the present invention. For example, a single data bus with address bits and corresponding ports can be substituted for some or all of the data ports and corresponding connections illustrated in FIG. 1. Additionally, some or all of the port connections, though illustrated in FIGS. 1 and 2 as single leads, can be formed by a plurality of separate leads. The configuration illustrated in FIGS. 1 and 2, therefore, represents just one exemplary embodiment and is not meant to limit the scope of the present invention.

Referring to FIGS. 3A–3D, there is shown a series of processing steps included in an exemplary embodiment of the present invention. The steps of FIGS. 3A–3D can be conceptually divided into five phases, although a different number of phases is possible. In a first phase (e.g., steps 302–304), the circuitry and devices illustrated in FIG. 1 are initialized. In a second phase (e.g., steps 306–336), the data received from the receiver is properly aligned with a clock signal. In a third phase (e.g., steps 340–360), a proper configuration of system 1, transmitter 170, and receiver 180 is confirmed, and a seed value used by the second BS generator during the fourth phase is identified. The third phase continues until consecutive groups of bits without any bit errors are transmitted or until it times out. In a fourth phase (e.g., steps 370–382), data needed to compute the propagation delay is gathered. In a fifth phase (e.g., steps 384–388), the propagation delay is calculated and/or the results of the measurement (attempt) are displayed.

Figure 3A:
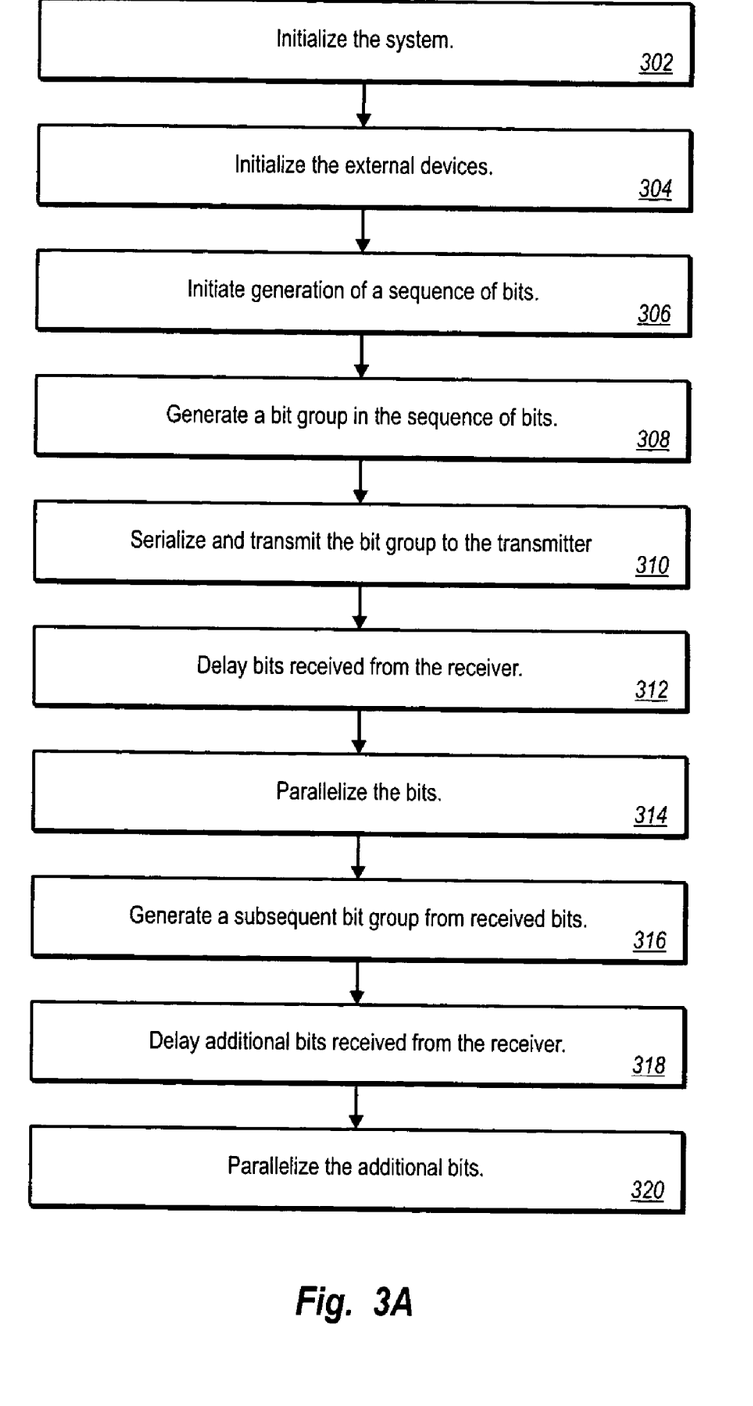
FIGS. 3A–3D illustrate an exemplary method of the present invention.

In a first step, control module 214 initializes system 1, as represented by block 302 in FIG. 3A. In particular, control module 214 directs controller 120 to set the clock frequency of the clock signal generated by clock source 150 and to turn clock source 150 on. The control module 214 can also direct controller 120 to set the length, type, and other characteristics of bit sequences generated by the BS generators. The controller 120 accomplishes this task by, for example, transmitting control signals through its first I/O port 122 and second I/O port 126 to I/O port 16 and I/O port 106 of first and second BS generators 10, 100, respectively.

The control module 214 can also direct controller 120 to clear clock count 140 and measurement data 142. The control module 214 can create a new record 218 in database 216 to store results of a measurement. Finally, control module 214 preferably directs controller 120 to set the delay value of programmable delay 30. In exemplary embodiments of the present invention, this delay value is initially set to the lowest delay value possible. As persons skilled in the art know, some programmable delay circuits have an inherent non-zero, minimum delay value.

The control module 214 then initializes external devices, as represented by block 304. In particular, control module 214 directs controller 120 to turn on transmitter 170 and receiver 180 and enable the optical transmitter circuitry of transmitter 170 by, for example, adjusting the state of a transmitter disable control signal. More specifically, controller 120, under the direction of control module 214, can transmit these control signals through its I/O port 136 to I/O port 176 of transmitter 170 and through its I/O port 138 to I/O port 186 of receiver 180.

The control module 214 then initiates the generation of a sequence of bits, as represented by block 306. This task is completed by controller 120, under the direction of control module 214. In particular, controller 120 can transmit a seed value through its $D_{out}$ port 124 to $D_{in}$ port 12 of first BS generator 10. In some embodiments of the present invention, controller 120, under the direction of control module 214, can also transmit a control signal through its I/O port 122 to I/O port 16 of first BS generator 10 to enable the generation of the sequence of bits by BS generator 10.

In response to step 306, first BS generator 10 begins generating a sequence of bits by generating a bit group in the sequence of bits, as represented by block 308. In exemplary embodiments of the present invention, bit groups are generated sequentially and transmitted in parallel. The BS generator 10 operates (i.e., generates bit groups) at the frequency of a clock signal originating from clock source 150. In an exemplary embodiment, this frequency can be 1 picosecond or less. The first BS generator 10 continues to generate bit groups in the sequence of bits, repeating the sequence of bits if necessary, until disabled by controller 120.

In one exemplary embodiment, first BS generator 10 is set to function in continuous blind mode. It uses a Pseudo Random Binary Sequence (PRBS) generation mode to generate the first sequence of bits. In this mode, BS generator 10 has the capability to insert a bit error into the sequence wherever desired. This first sequence of bits can be, by way of example and not limitation, 80 bits. One skilled in the art will realize that other numbers of bits can be generated as well.

Each bit group generated by first BS generator 10 is serialized by SERDES 20 and transmitted to transmitter 170, as represented by block 310. The SERDES 20 receives bit groups through its $D_{in}$ port 22 from first BS generator 10 in parallel, and transmits these bit groups serially through its $D_{out}$ port 24.

The transmitter 170 receives bits transmitted by SERDES 20 through its $D_{in}$ port 172 in an electrical form and transmits them in an optical form through its $D_{out}$ port 174 to receiver 180. The receiver 180 receives bits transmitted by transmitter 170 through its $D_{in}$ port 182 in an optical form and transmits them in an electrical form through its $D_{out}$ port 184 to $D_{in}$ port 32 of programmable delay 30.

The programmable delay 30 receives bits transmitted by receiver 180 and delays by a specified amount of time before transmitting these bits to deserializer 90, as represented by block 312. More specifically, programmable delay 30 receives bits transmitted serially by receiver 180 through its $D_{in}$ port 32 and transmits these bits after the specified delay through its $D_{out}$ port 34 to $D_{in}$ port 92 of deserializer 90.

The deserializer 90 receives bits transmitted serially by programmable delay 30 and parallelizes them, as represented by block 314. More specifically, deserializer 90, using a clock signal from clock source 150, receives bits transmitted serially by programmable delay 30 through its $D_{in}$ port 92 and transmits these bits as a bit group in parallel through its $D_{out}$ port 94 to both controller 120 and second BS generator 100. The clock signal used by the deserializer to receive serial data bits can be the fastest clock signal generated by clock source 150.

The second BS generator 100 generates a subsequent bit group from the bit group received through its $D_{in}$ port 102 from deserializer 90, as represented by block 316. Bit sequences generated by the BS generators illustrated in FIG. 1 are deterministic, so when configured in the same manner, these BS generators generate the same bit group from a given bit group. The output of first BS generator 10 is typically fed back to first BS generator 10 to generate another bit group in the sequence of bits. Similarly, second BS generator 100 uses the bit group transmitted to it by deserializer 90 as a seed value to generate a subsequent bit group in the sequence of bits. Because second BS generator 100 is configured to produce the same sequence of bits as first BS generator 10, second BS generator 100 generates the same bit group that first BS generator 10 generates from a given input bit group.

The subsequent bit group is transmitted by second BS generator 100 through its $D_{out}$ port 104 to second $D_{in}$ port 134 of controller 120. The subsequent bit group is not output by second BS generator 100 until a subsequent clock cycle. While deserializer 90 transmits the bit group to BS generator 100 in step 310, programmable delay 30 delays another bit group received from receiver 180, as represented by block 318. The deserializer then parallelizes this bit group, as represented by block 320. As indicated above, parallelizing a bit group includes transmitting the bits in parallel to both controller 120 and second BS generator 100. The bit group received in step 318 is transmitted to controller 120 during the same clock cycle in which the subsequent bit group generated by BS generator 100 in step 316 is transmitted to controller 120.

Figure 3B:
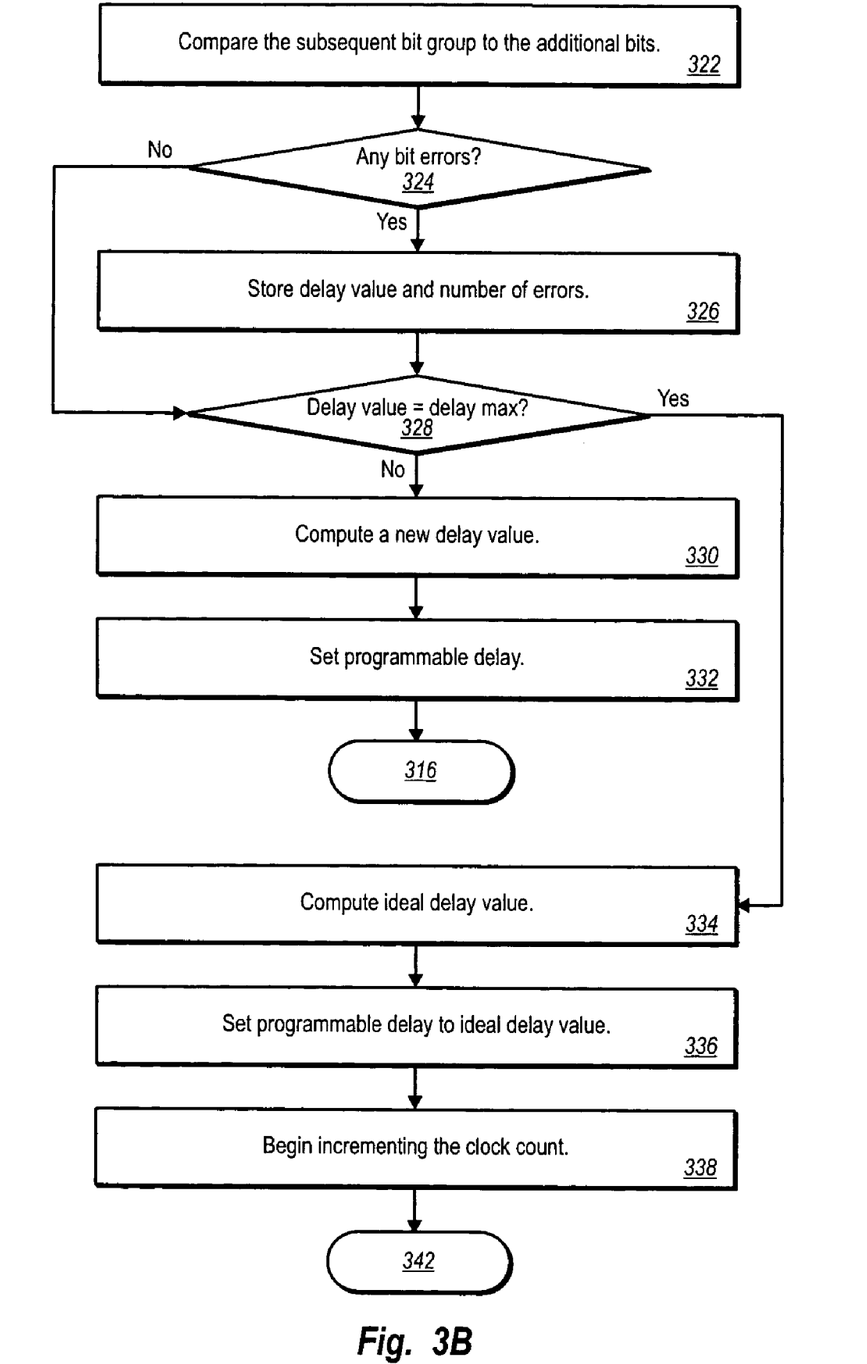

The controller 120 compares the bit groups transmitted by deserializer 90 and second BS generator 100, respectively, as represented by block 322 in FIG. 3B. If there are any bit errors, i.e., one or more of the bits do not match, which corresponds to decision block 324 being answered "Yes", the results of the comparison (e.g., the number of bit errors) along with the delay value of programmable delay 30 are stored as part of measurement data 142, as represented by block 326.

If there are no bit errors, which corresponds to decision block 324 being answered "No", or after storing the results of the comparison and the delay value (step 326), controller 120 determines whether the delay value of programmable delay 30 is equal to the delay value maximum, as represented by decision block 328. This determination can be made by for example, interfacing with programmable delay 30 through an I/O port or by maintaining the current delay value as part of measurement data 142 and updating it each time programmable delay 30 is updated. In exemplary embodiments of the present invention, the delay value maximum is approximately equal to the duration of two unit intervals of the data signal transmitted through transmitter 170 and receiver 180.

If the delay value of programmable delay 30 is not equal to the delay value maximum, which corresponds to decision block 328 being answered "No", controller 120 computes a new delay value for programmable delay 30, as represented by block 330. The new delay value is computed by incrementing the current delay value by an amount that is a fraction of the unit interval of the data signal transmitted through transmitter 170 and receiver 180, mentioned in the preceding paragraph. The controller 120 then sets programmable delay 30 with the new delay value, as represented by block 332. The controller 120 can also update measurement data 142 to include the new delay value as well.

The steps outlined in blocks 316–332 are then repeated until the delay value of programmable delay 30 is equal to the delay value maximum, which corresponds to decision block 328 being answered "Yes". When this occurs, controller 120 computes an ideal delay value from the bit error counts and corresponding delay values stored in measurement data 142, as represented by block 334.

In an exemplary embodiment, controller 120 begins by sequentially scanning the bit error counts and corresponding delay values stored in measurement data 142 for a first delay, which corresponds to a bit error count below a defined threshold. The scanning begins with the minimum delay and ends with the maximum delay. After locating the first delay, scanning continues for a second delay, which corresponds to a bit error count above the defined threshold.

Bit error counts above the defined threshold tend to occur when a data signal is sampled at or close to a temporal boundary of a bit period since a data signal does not switch from one state to another instantaneously. The delay can cause the signal to fluctuate between 1 and 0 at the temporal boundary. The threshold is selected, therefore, so that an equal or greater bit error count is indicative of a sample taken near a temporal boundary of a bit period instead of just bit errors that can and do occur for other reasons. Similarly, the threshold is selected so that it is unlikely that the bit error count of subsequent delays will drop below the threshold until after a temporal boundary of the bit period has passed. This last requirement prevents small increases in bit error counts, which might not be associated with a temporal boundary of a bit period, from being misinterpreted.

Additionally, the increment used to adjust the delay value in step 330 is small enough so that at least one delay corresponds to the region of time at or just before a temporal boundary of a bit period and at least one delay corresponds to the region of time just after a temporal boundary of a bit period. As a result, the second delay ideally corresponds to the region of time at or just before a temporal boundary of a bit period.

After finding the second delay, scanning continues for a third delay, which corresponds to a bit error count below the defined threshold. Ideally, the third delay corresponds to a region of time just after a temporal boundary of a bit period.

After finding the second and third delays (e.g., a first temporal boundary of a bit period), controller 120 continues scanning for a fourth and fifth delay (e.g., a second temporal boundary of the bit period). The fourth delay is the next delay corresponding to a bit error count above the defined threshold. Additionally, the fifth delay is the next delay, following the fourth delay, corresponding to a bit error count below the defined threshold.

After the second, third, fourth, and fifth delays are located (e.g., two temporal boundaries of a bit period have been located), they are summed and divided by four. The result is a delay value that corresponds to a temporal position roughly midway between the temporal boundaries of a bit period.

Note that in some exemplary embodiments of the present invention, a plurality of bit groups are transmitted for each value of the delay value stored in programmable delay 30. In these embodiments, clock count 140 can be used to track how many bit groups have been transmitted with a given delay value. Each time the delay value is updated, clock count 140 is cleared.

In these embodiments, an extra test can be conducted before calculating and setting the delay value in steps 330 and 332. If some predefined count value has not yet been reached, steps 330 and 332 are not executed before returning to step 316. Transmitting a plurality of bit groups for each delay value enables a more accurate determination of the ideal delay value. Also, clock count 140 is cleared upon completion of this phase as well so as not to interfere with the next phase. The controller 120 then sets programmable delay 30 with the ideal delay value calculated in step 334, as represented by block 336. The controller 120 then begins incrementing clock count 140, as represented by block 338, each time a bit group is received from deserializer 90.

Figure 3C:
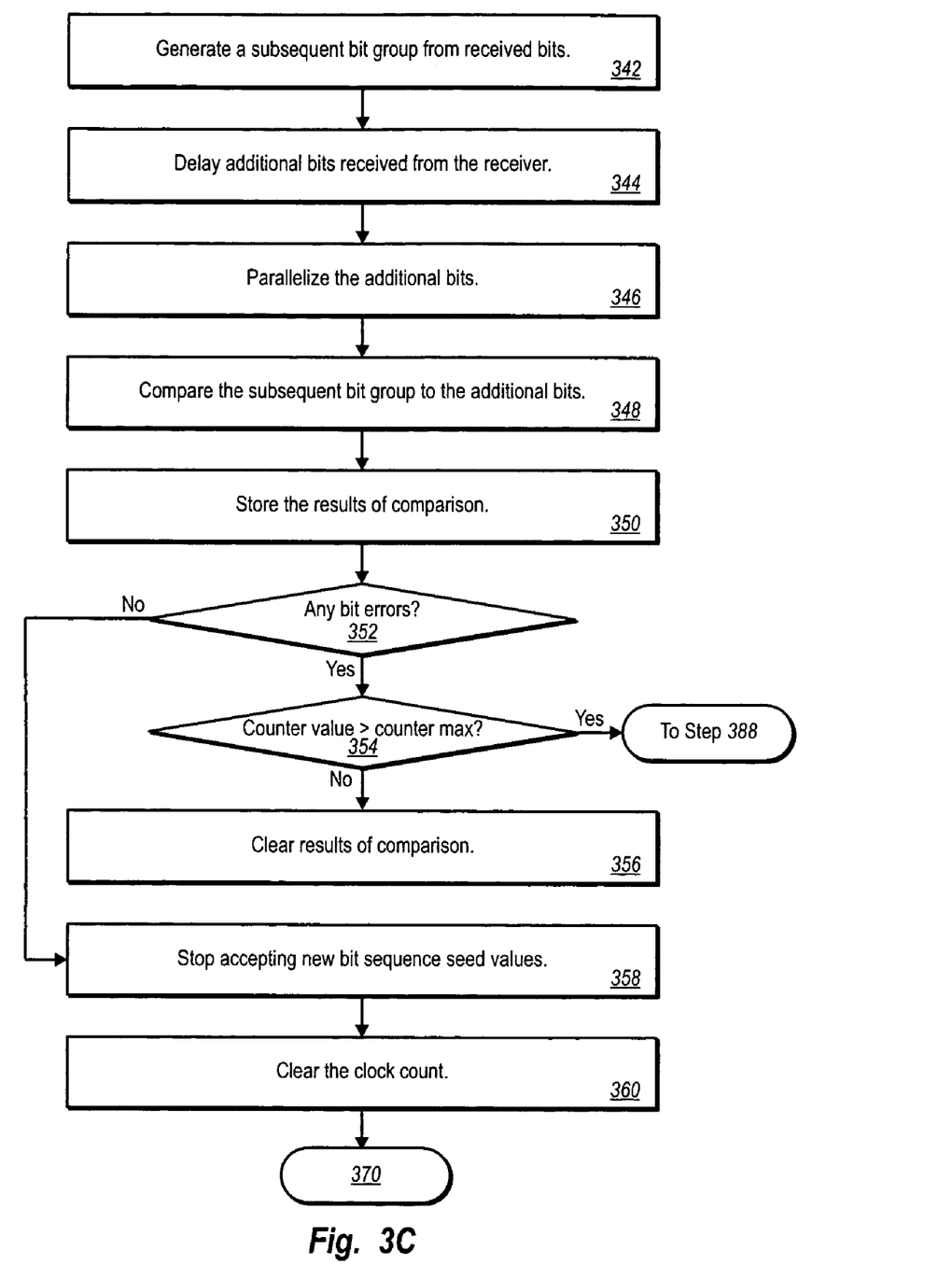

The second BS generator 100 then generates a subsequent bit group from a bit group received through its $D_{in}$ port 102 from deserializer 90, as represented by block 342 in FIG. 3C. The subsequent bit group is transmitted by second BS generator 100 through its $D_{out}$ port 104 to second $D_{in}$ port 134 of controller 120, but the subsequent bit group is not output by second BS generator 100 until a subsequent clock cycle. While deserializer 90 transmits the bit group to BS generator 100 in step 314, programmable delay 30 delays another bit group received from receiver 180, as represented by block 344. The deserializer then parallelizes this bit group, as represented by block 346, as described above.

The controller 120 compares the bit groups transmitted by deserializer 90 and second BS generator 100, respectively, as represented by block 348, and stores the results of the comparison (e.g., the number of bit errors) as part of measurement data 142, as represented by block 350. If there are any bit errors, i.e., one or more of the bits do not match, which corresponds to decision block 352 being answered "Yes", controller 120, checks the value of clock count 140 to determine whether it is greater than a predefined counter value (e.g., a counter value maximum), as represented by block 354, which can be maintained by either controller 120 or computer 160.

As noted above, the purpose of the third phase is to confirm the configuration of system 1, transmitter 170, and receiver 180 and to identify a seed value to use as a controlling pattern for second BS generator 100. If clock count 140 exceeds the predefined counter value, it can be safely assumed that system 1, transmitter 170, and receiver 180 are not configured properly.

If clock count 140 is not greater than the predefined counter value, which corresponds to decision block 354 being answered "No", controller 120, under the direction of control module 214, can clear the bit error count stored in the previous execution of step 350, as represented by block 356. The cycle of receiving bit groups, generating subsequent bits groups, and comparing the two then continues until there are no bit errors or clock count 140 exceeds the predefined counter value. Note that second BS generator 100 continues to accept new bit sequence seed values from deserializer 90. Because there were one or more bit errors detected during the most recent bit group comparisons, it may be that the bit sequence seed values used to produce two of the compared bit groups are invalid.

Figure 3D:
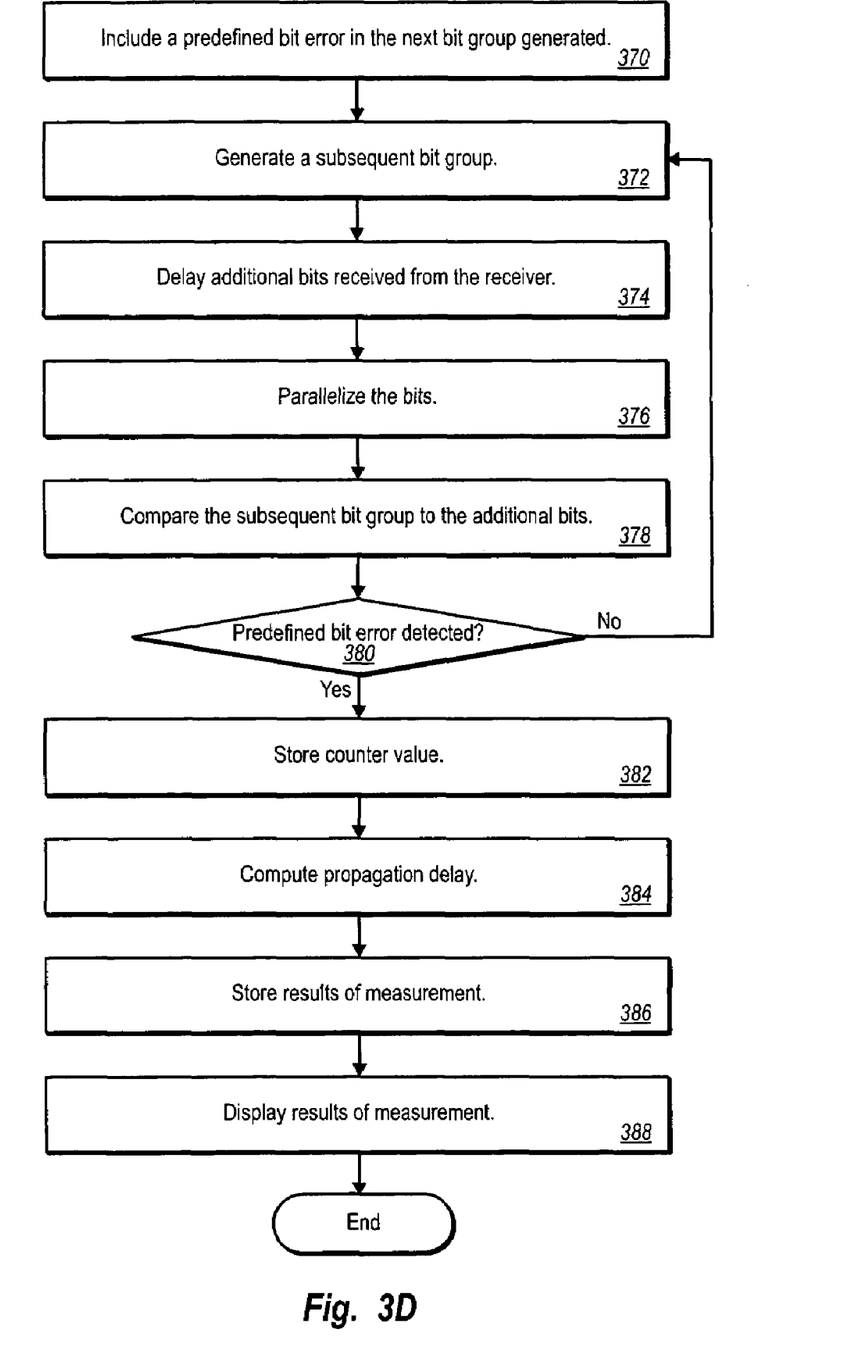

If clock count 140 is greater than the predefined counter value, which corresponds to decision block 354 being answered "Yes", the results of the measurement can be displayed via user interface 206, as represented by block 388 in FIG. 3D. If step 388 is reached in this fashion, the results will indicate that there is a problem with the configuration of transmitter 170, receiver 180, and/or system 1 and that an actual measurement was never made.

Returning to step 352, if there are no bit errors, which corresponds to decision block 35 being answered "No", controller 120, under the direction of control module 214, directs second BS generator 100 to stop accepting bit groups from deserializer 90, as represented by block 358, clears clock count 140 (step 360), and directs BS generator 10 to include a predefined bit error in the next bit group generated thereby, as represented by block 370 in FIG. 3D. Typically, the predefined bit error has a first bit in a bit group being switched. For example, if the bit is a digital "one", it is switched to a digital "zero" and vice versa. In other embodiments, one or more bits, which may or may not include the first bit, are switched. This bit group is then serialized and transmitted to transmitter 170 as described above, with respect to FIG. 3A.

Steps 360 and 370 of FIGS. 3C and 3D mark the end of the third phase and the beginning of the fourth phase, respectively. As indicated above, the third phase identifies a bit sequence seed value for second BS generator 100. This happens when consecutive bit groups are transmitted without bit errors. This means that second BS generator 100 can now generate the exact bit sequence generated by first BS generator 10 without additional bit sequence seed values from deserializer 90. Instead, the subsequent bit groups generated by second BS generator 100 will now be fed back to the second BS generator, as seed values to generate additional subsequent bit groups. The controller 120 can direct second BS generator 100 to stop accepting bit groups from deserializer 90 by, for example, transmitting control signals through its second I/O port 126 to I/O port 106 of second BS generators 100. Furthermore, controller 120 can direct BS generator 10 to include the predefined bit error in the next bit group by, for example, transmitting a command through first I/O port 122 of controller 120 and I/O port 16 of BS generator 10.

The second BS generator 100 then generates a subsequent bit group from the "subsequent bit group" compared during the most recent execution of step 348, as represented by block 372 in FIG. 3D. This previous "subsequent bit group" is fed back to second BS generator 100. The programmable delay 30 delays another bit group received from receiver 180, as represented by block 374, and then deserializer 90 parallelizes this bit group, as represented by block 376, as described above with reference to step 314 of FIG. 3A.

The controller 120 then compares the bit groups transmitted by deserializer 90 and second BS generator 100, respectively, as represented by block 378. If there are no bit errors or any bit errors detected are not the predefined bit error, which corresponds to decision block 380 being answered "No", steps 372–378 are repeated. But if the predefined bit error is detected (step 380-Yes), controller 120 stores the value of clock count 140 as part of measurement data 142, as represented by block 382. Recall that the value of clock count 140 is incremented by pulses of a clock signal originating from clock source 150. Typically, this coincides with each set of bit groups transmitted from BS generator 10, The propagation delay is then calculated from the data stored in step 382 and other data as described below, as represented by block 384. In some exemplary embodiments, controller 120 transmits the data stored in step 382 to computer 160, which then calculates the propagation delay. Alternately, controller 120 calculates the propagation delay and then transmits the result to computer 160.

As indicated in the propagation delay (PD) equation below, the clock count stored in step 382 (CC) is multiplied by the number of bits in a bit group (BG) to account for the delay associated with each bit in the bit groups represented by the CC. In exemplary embodiments, the "other data" mentioned in the preceding paragraph can include the bit position of the predefined bit error (PB). For example, if the bit position of the predefined bit error is 4 (as determined by controller 120), the first three bits of the bit group are accounted for by the inclusion of the term (PB-4) in the propagation delay equation below. Further, the "other data" can include an instrument delay (ID) as well. The ID typically includes separate delays occurring within system 1, transmitter 170, and receiver 180. More specifically, the DI can include, for example, the amount of time it takes a signal to propagate through system 1, transmitter 170, and receiver 180 and the amount of time it takes these devices to respond to commands (e.g., a command to initiate the generation of a bit group). The "other data" also can include the ideal delay (DI) calculated in step 322 and the bit rate (BR) of the bit groups when transmitted serially by system 1, transmitter 170, and receiver 180. The bit rate is used to transform a count of bits into a temporal value (usually picoseconds).

The propagation delay (PD) equation is as follows:

$$PD = ((CC*BG) + (PB-1))/BR) - DI - ID \qquad (1)$$

The resulting propagation delay represents the delay of a signal passing through optical fiber 190. The computer 160 can then store the results of the measurement in a record 218 of database 216, as represented by block 386, and display the results of the measurement via user interface 206, as represented by block 388. If step 388 is reached in this fashion, the results include the propagation delay calculated in step 384.

Alternatively, the PD can be computed by executing the steps illustrated in FIGS. 3A–3D and described in detail above with an optical fiber 190 having a known PD. The equation of the ID is as follows:

$$ID = PD - ((CC*BG) + (PB1)/BR) + DI \qquad (2)$$

The ID calculated in this fashion can then be used to compute the PD for an optical fiber 190 with an unknown delay.

While exemplary embodiments of the present invention have been disclosed, it will be understood that, in view of the foregoing description, other configurations car, provide one or more of the features of the present invention, and all such other configurations are contemplated to be within the scope of the present invention. For example, FIGS. 3A–3D illustrate steps sequentially, but some of these steps can actually occur at roughly the same time or in parallel (e.g., steps 370 and 372 and steps 386 and 388, respectively). Furthermore, one or more optical fibers or an electronic, optoelectronic, or other device can be substituted for optical fiber 190 to determine a propagation delay therethrough.

Additionally, a propagation delay through either transmitter 170 or receiver 180 can be determined through the use of a transmitter or receiver with a known propagation delay. Tests can be conducted in order to determine the instrument delay (not including the transmitter or receiver) prior to determining the propagation delay of transmitter 170 or receiver 180.

Accordingly, it should be clearly understood that the embodiments of the invention described above are to be considered in all respects only as illustrative and not restrictive and are not intended as limitations on the scope of the invention, which is defined only by the claims that are now or may later be presented. The scope of the invention is, therefore, indicated by the appended claims rather than by the foregoing description. All changes which come within the meaning and range of equivalency of the claims are to be embraced within their scope.

What is claimed is:

1. A system for measuring a signal propagation delay, said system being adapted to electrically communicate with at least one transmitter and at least one receiver, said system comprising:
    a first bit sequence generator used to generate a first sequence of bits that is to be transmitted through an object with, an unknown propagation delay;
    a second bit sequence generator that receives said first sequence of bits from said object, said second bit sequence generator generating a second sequence of bits identical to said first sequence; and
    a controller that receives said first and second sequences of bits, said controller compares said sequences to confirm that said sequences are identical, instructs said first bit sequence generator to inject a predefined bit error into a third sequence of bits while simultaneously starting a clock count from a clock source, maintains said count that is incremented each time said controller checks for said bit error, stops incrementing said count when said bit error is detected, and computes said propagation delay by reference to said count.

2. The system of claim 1, wherein said object is one of a length of fiber optic cable, an electronic device and an opto-electronic device.

3. The system of claim 1, wherein said first BS generator and said second BS generator produce identical output from identical input.

4. The system of claim 1, wherein said first BS generator and said second BS generator each operate at a frequency of a clock signal generated by said clock source.

5. The system of claim 1, wherein said controller computes an ideal delay value from said first and second bit sequences and uses said ideal delay value to compute said propagation delay.

6. The system of claim 5 wherein said predefined bit error is generated for a particular bit position and said controller uses said particular bit position to calculate said propagation delay.

7. The system of claim 1 wherein said predefined bit error is generated for a particular bit position and said controller uses said particular bit position to calculate said propagation delay.

8. In a system for measuring a signal propagation delay, said system being adapted to electrically communicate with at least one transmitter and at least one receiver, said system comprising a first bit sequence generator, a second bit sequence generator, a clock source and a controller, a method for computing to signal propagation delay comprising the steps of:
    computing an ideal delay value;
    injecting an error into a bit sequence generated by the bit sequence generators and maintaining a clock count from to clock source until the controller receives said error;
    determining a bit position for said error in said bit sequence; and
    calculating the propagation delay from said ideal delay value, said clock count and said bit position.

9. The method of claim 8 wherein said step of computing an ideal delay value further comprises the steps of:
    setting an initial value for said delay;
    generating a first sequence of bits;
    sending said first sequence of bits to the at least one transmitter, which sends said first sequent of bits to the at least one receiver, which sends said first sequence of bits to a programmable delay device;
    delaying said first sequence of bits received from the at least one receiver;
    generating a second sequence of bits, said second sequence of bits also being sent to the at least one transmitter, the at least one receiver and said programmable delay device;
    comparing said first sequence of bits to said second sequence of bits to determine if there are any bit errors;
    if said bit errors are encountered, incrementing said initial value for said delay and repeating said first and said second generating steps; and
    if said bit errors are not encountered, computing said ideal delay.

10. The method of claim 9 wherein the steps of generating said first and second sequences of bits includes generating a series of bit groups.

11. The method of claim 10 wherein each of said bit groups contains at least 80 bits.

12. The method of claim 8 wherein said step of using said ideal delay value to gather data includes the steps of:
  resetting said clock counter value to zero and beginning a new count;
  including a predefined bit error in a next bit group generated;
  generating a subsequent bit group;
  delaying any additional bits received from said receiver by said ideal delay;
  comparing said subsequent bit group to said additional bits;
  if said comparing does not detect said predefined bit error, generating a second subsequent bit group until said comparing step detects said predefined error, and
  if said comparing detects said predefined bit error, storing said clock counter value and computing said propagation delay.

13. The method of claim 8, wherein said object is one of a length of fiber optic cable, an electronic device and an opto-electronic device.

14. In a computerized system comprising a circuit board having electrical circuitry connecting a first bit sequence (BS) generator, a serializer/deserializer (SERDES), a programmable delay, a deserializer, a second BS generator, a controller, and a clack source, said system further comprising an transmitter and a receiver electrically connected to the circuit board, a method for computing a signal propagation delay through an object comprising the steps of:
  initializing the first bit sequence (BS) generator, the serializer/deserializer (SERDES), the programmable delay, the deserializer, the second BS generator, the controller, the clock source, the circuit board, the transmitter and the receiver,
  aligning data from the receiver with a clock signal from the clock source and storing a clock counter value;
  identifying an ideal delay value for the programmable delay;
  using said ideal delay value to gather data needed to determine the propagation delay; and
  calculating the propagation delay using said data.

15. The method of claim 14 wherein said step of identifying an ideal delay further comprises the steps of:
  setting an initial value for the delay;
  generating a first sequence of bits;
  sending said first sequence of bits to the transmitter, which sends said first sequent of bits to the receiver, which sends said first sequence of bits to the programmable delay;
  delaying said first sequence of bits received from the receiver;
  generating a second sequence of bits, said second sequence of bits also being sent to the transmitter, the receiver and the programmable delay;
  comparing said first sequence of bits to said second sequence of bits to determine if there are any bit errors;
  if said bit errors are encountered, incrementing said initial value for said delay and repeating said first and said second generating steps; and
  if said bit errors are not encountered, computing said ideal delay.

16. The method of claim 15 wherein the steps of generating said first and second sequences of bits includes generating a series of bit groups.

17. The method of claim 16 wherein each of said bit groups contains at least 80 bits.

18. The method of claim 17 wherein said step of using said ideal delay value to gather data includes the steps of:
  resetting said clock counter value to zero and beginning a new count;
  including a predefined bit error in a next bit group generated;
  generating a subsequent bit group;
  delaying any additional bits received from the receiver by said ideal delay; comparing said subsequent bit group to said additional bits;
  if said comparing step does not detect said predefined bit error, generating a second subsequent bit group until said comparing step detects said predefined error, and
  if said comparing step detects said predefined bit error, storing said clock counter value and computing said propagation delay.

19. The method of claim 18, wherein said predefined bit error is generated for a particular bit position and said controller uses said particular bit position to calculate said propagation delay.

20. The method of claim 14, wherein said object is one of a length of fiber optic cable, an electronic device and an opto-electronic device.

* * * * *

UNITED STATES PATENT AND TRADEMARK OFFICE
CERTIFICATE OF CORRECTION

PATENT NO. : 7,020,567 B2  Page 1 of 1
APPLICATION NO. : 10/695477
DATED : March 28, 2006
INVENTOR(S) : Fishman et al.

It is certified that error appears in the above-identified patent and that said Letters Patent is hereby corrected as shown below:

Column 5
Line 35, change "FIG. 3" to --FIGS. 3A-3D--

Column 11
Line 47, change "35" to --352--

Column 13
Line 13, change "$ID=PD-((CC*BG)+(PB1)/BR)+DI$" to
--$ID=PD-((CC*BG)+(PB-1)/BR)+DI$--
Column 20, change "car," to --can--

Column 14
Line 30, change "to signal" to --the signal--
Line 35, change "to clock" to --the clock--

Column 15
Line 25, change "clack" to --clock--
Line 26, change "an transmitter" to --a transmitter--

Column 16
Line 35, change "error," to --error;--

Signed and Sealed this

Twenty-sixth Day of August, 2008

JON W. DUDAS
*Director of the United States Patent and Trademark Office*